United States Patent Office 3,136,794
Patented June 9, 1964

3,136,794
STABILIZATION OF IODINE ISOMERIZED
VITAMIN A ESTERS
Charles E. Maxwell III, Quaker Hill, Conn., assignor to Chas. Pfizer & Co., Inc., New York, N.Y., a corporation of Delaware
No Drawing. Filed Feb. 2, 1962, Ser. No. 170,808
1 Claim. (Cl. 260—410)

This invention relates to a process for the preparation of stable mixtures of isomeric vitamin A and esters thereof. More specifically it relates to a process for the preparation of thermally stable mixtures of iodine isomerized vitamin A and esters thereof.

In natural vitamin A, such as that present in a number of the common fish liver oils, for example, soupfin shark liver oil, cod, dogfish, halibut, and California jewfish liver oil, the total vitamin A content consists of approximately 65% vitamin A, the all trans form, and approximately 35% neovitamin A, the trans-cis form.

Synthetic vitamin A on the other hand may, depending on the process used, be obtained solely as the all trans isomer, vitamin A, or solely as neovitamin A, the trans-cis geometrical isomer. As used throughout the specification, the all trans isomer of vitamin A is referred to simply as vitamin A. The trans-cis form (the double bond of the allyl alcohol moiety is cis) is referred to as neovitamin A.

Pure, or substantially pure, vitamin A and esters thereof undergo a gradual conversion to other isomers, predominantly neovitamin A and esters thereof, resulting ultimately in an apparent equilibrium mixture comprising vitamin A and neovitamin A in an approximate ratio of 2:1. Because of this transformation, vitamin compositions, particularly liquid vitamin compositions, containing a definite and known amount of vitamin A, generally as the acetate or palmitate ester, are found to undergo a loss in vitamin A potency on storage. This loss in potency is, of course, detrimental from a sales standpoint. However, it can be overcome by the expedient of using an initially greater quantity of vitamin A ester to compensate for the decrease in potency or, alternatively and preferably, by employing an equilibrium mixture of vitamin A ester and neovitamin A ester.

The cis-trans isomerization of vitamin A and esters thereof to neovitamin A and esters thereof can be accomplished by the following method: (1) refluxing in a solvent; (2) by illumination (photo-isomerization); (3) acid catalysis; (4) iodine catalysis; (5) thermal isomerization.

Of the above isomerization methods, isomerization by iodine catalysis in the presence or absence of light or illumination is preferred since it avoids decomposition of the vitamin A esters and minimizes the formation of other possible geometrical isomers. The well known and powerful catalytic effect of iodine permits rapid isomerization under mild conditions and thus avoids or at least minimizes destruction of vitamin A and its esters and/or oxidation by air. However, the isomerized mixtures containing iodine are thermally unstable. On storage, especially storage at elevated temperatures, that is at temperatures greater than about 35° C., such mixtures undergo decomposition.

The equilibrium mixture thus produced contains from about 25% to 35% neovitamin A and from about 75%–65% vitamin A. The iodine catalyzed isomerization of vitamin A or its esters, e.g. acetate, $\alpha,\alpha$-dimethylpalmitate, propionate, butyrate, $\alpha$-methyl-$\alpha$-ethyl-caproate, palmitate, $\beta$-naphthoate, anthraquinone-$\beta$-carboxylate, $\alpha$-phenylazobenzoate and like esters, is conducted in a suitable reaction-inert solvent, that is, a solvent which does not enter into the reaction and which dissolves the reactants and products. In like manner neovitamin A and esters thereof are converted to a mixture of neovitamin A and vitamin A and esters thereof having substantially the same proportions as the mixture obtained by isomerization of vitamin A. Suitable solvents are the aliphatic hydrocarbons such n-butane, n-pentane, n-hexane, n-heptane, aromatic hydrocarbons such as benzene, toluene, xylenes; tetrahydrofuran and chlorinated solvents such as methylene chloride and chloroform.

The isomerization is conducted at a temperature of from about −20° C. to about 25° C., preferably at a temperature of from about −5° C. to about 10° C. The optimum temperature range is from about 0° C. to about 5° C. The isomerization is carried out over a period of from about 0.5 hour to about 2 hours. Light or some form of illumination need not be present although a promoting effect appears to be exerted on the transformation when such is present. However, the isomerization proceeds sufficiently rapidly in the absence of light or in subdued light as to preclude the specific necessity of light or illumination.

In general, amounts of iodine up to 2% by weight of the vitamin A or ester thereof to be isomerized can be used. Quantities of from about 0.05% to about 0.1% appear to be highly effective in causing isomerization.

The removal of the iodine from a mixture resulting from the iodine catalyzed interconversion of the anthraquinone-$\beta$-carboxylate esters of vitamin A and neovitamin A by means of sodium thiosulfate was reported by Robeson et al. (J. Am. Chem. Soc. 69, 140 (1957)). Their procedure consisted of passing a benzene solution of the iodine containing isomeric mixture of esters through a column of sodium thiosulfate. Repetition of the sodium thiosulfate procedure of Robeson et al. has been found ineffective in removing all iodine present or at least in removing sufficient iodine to overcome the thermal instability associated with the presence of iodine.

Other common reducing agents for iodine such as sodium bisulfite, pyridine, and pyridine-zinc dust have likewise been found ineffective in lowering the iodine content to levels wherein thermal instability is no longer effected.

It has now been found that sodium borohydride is remarkably effective in removing iodine from iodine isomerized vitamin A and neovitamin A esters and produces products having satisfactory thermal stability. The quantity of sodium borohydride useful for this purpose is determined by the amount of iodine initially used to effect isomerization. While an equivalent proportion of sodium borohydride is necessary, in actual practice an excess of sodium borohydride is generally used to insure complete and rapid removal of the iodine. In general an amount of sodium borohydride equivalent to from about 5 to about 10 times the weight of iodine initially used is especially effective from a practical standpoint. Larger or smaller quantities can, of course, be used but offer no advantages. In the case of larger quantities there exists the problem of removing the excess or unreacted sodium borohydride and in the case of smaller quantities there is the problem of complete iodine removal.

The sodium borohydride reduction of iodine is most advantageously conducted in the same solvent system employed for the isomerization reaction. Here, as then, the same considerations as to solvent apply. The solvents most useful in both steps of the process, particularly in the sodium borohydride reduction are the hydrocarbon solvents n-butane, n-pentane, n-hexane and n-heptane. n-Hexane is the preferred solvent. The solvent systems used need not be anhydrous. The commercially available solvents, most of which contain some water, are operative. Substantial amounts of water should, of course, be avoided in order to prevent the formation of hydriodic acid and subsequent decomposition of vitamin A or esters thereof.

The sodium borohydride reduction proceeds satisfactorily but somewhat slowly in the above-mentioned solvents. It has been found that the presence of a minor amount of a hydroxylic solvent such as a lower alkanol, e.g., those alcohols containing up to six carbon atoms, facilitates the reaction. Methanol, ethanol, propanol and isopropanol are especially useful in this respect. From about 0.5% to about 10% by volume of the chosen lower alkanol based on the volume of solvent used promotes efficient reduction of the iodine. The preferred amount of lower alkanols range from about 1% to about 5% by volume. Higher concentrations are, of course, operative but appear to offer no advantages. The lower alkanol can be added at any time in the overall sequence that is, prior to, concurrent with or subsequent to the sodium borohydride.

In general, a period of from about 0.5 to about 2 hours permits complete reduction of the iodine. The time required is dependent in part on the absence or presence of a lower alkanol. For this reason, in order to expedite the overall process a lower alkanol is highly desirable during the reduction step.

The temperature ranges described above in connection with the iodine isomerization reaction are also the operative, preferred and optimum temperature ranges for the sodium borohydride reduction.

The excess or unreacted sodium borohydride and reduction products are removed from the mixture by an aqueous wash, preferably with an aqueous alcoholic solution such as aqueous methanol, ethanol, propanol or isopropanol. The most effective compositions comprise alcohol-water in which the ratio of alcohol to water is from about 9-1 to about 1-1. Methanol-water washes containing from about 50% to about 80% methanol e.g., the ratio of methanol-water is from about 1-1 to about 4-1, represent the preferred aqueous wash systems. Water alone, while effective in removing excess or unreacted sodium borohydride, frequently results in the formation of emulsions which are difficult to break. For this reason, aqueous-alcohol wash solutions are favored. The washed vitamin A-neovitamin A mixture is recovered by evaporation of the solvent. The residual amount of boron in the vitamin A-neovitamin A mixture is thus reduced to negligible proportions.

The reaction can, if desired, be conducted in the absence of oxygen, that is in an inert atmosphere, e.g. under nitrogen. However, this precaution appears unnecessary.

Similarly, the related potassium and lithium borohydrides can be used in lieu of sodium borohydride to effectively remove the iodine from such isomerization mixtures.

Since the acetate and palmitate esters of vitamin A are presently the principal commercial forms, the herein described process applies, in the main, to isomeric mixtures obtained from the acetate and palmitate esters of vitamin A and neovitamin A. However, it should be borne in mind that other esters, for example, anthraquinone-β-carboxylate, α,α-dimethylpalymitate, β-naphthoate, p-phenylazobenzoate, propionate and butyrate, of vitamin A and neovitamin A and the free alcohol form can be isomerized as described above and thence converted to the alcohol, acetate or palmitate by known methods.

It will, of course, be obvious to, and appreciated by those skilled in the art, that this method for the removal of iodine from isomerized vitamin A and neovitamin A is also generally applicable to the iodine isomerization of carotenoids.

The following examples are provided by way of illustration and are not to be construed as limitations of this invention and are not to be construed as limitations of this invention, many variations of which are possible without departing from the scope and spirit thereof.

Example I

To a solution of vitamin A palmitate (50 g.) in 350 ml. of n-hexane in a flask of actinic glass at 0° to 5° C. is added a solution of iodine (50 mg.) in 150 ml. n-hexane. The reaction mixture is stirred at 0° to 5° C. for one hour at the end of which time the cooling bath is removed. Sodium borohydride (500 mg.) is added and the mixture stirred for 15 minutes. Methanol (5 ml.) is added and the mixture stirred for 45 minutes at the end of which time it is washed successively with three 200 ml. volumes of methanol-water (4:1). The solvent is removed in vacuo at a temperature below 40° C. leaving the mixture of isomeric esters.

Assay of the mixture according to the procedure set forth in USP XVI, 938 (1960) shows the mixture contains 60% vitamin A palmitate and 32% other isomers, the major portion of which is neovitamin A palmitate.

A sample of the isomeric mixture heated for 24 hours at 100° C. in a sealed ampul and shows no decomposition on comparison with an unheated sample.

Example II

The procedure of Example I is repeated using the acetate, trimethylacetate, p-phenylazobenzoate, β-naphthoate, anthraquinone-β-carboxyate, propionate, butyrate, caprate, α,methyl-α-ethylcaproate, and α,α-dimethylpalmitate esters of vitamin A in place of the palmitate.

In each instance the mixture of isomeric esters produced is found upon assay to contain approximately 62 to 70% of the all-trans isomer and 38 to 30% of other isomers in which the neovitamin A isomer predominates. Samples of the isomeric mixtures when heated at 100° C. for 24 hours are found to be as stable as are unheated samples.

Example III

Repetition of the procedure of Example I but using a plani glass flask in place of actinic glass produces substantially the same results.

Example IV

The procedure of Example I is repeated using n-pentane, n-heptane, chloroform and tetrahydrofuran individually in place of n-hexane. The isomeric mixture of esters produced are found to be as thermally stable as the product of Example I.

Example V

The procedure of Example I is repeated but using n-butane as solvent in lieu of n-hexane and a temperature throughout the entire reaction of −10° to −20° C. The resulting mixture of isomeric esters is substantially identical in composition and stability as is the product of Example I.

Example VI

Following the procedure of Example I neovitamin A palmitate, acetate, α,α-dimethylpalmitate, propionate, caprate, caproate, and butyrate are isomerized to their corresponding isomeric mixtures wherein the ratio of vitamin A ester to other isomers is from about 65–75% to about 35–25%.

The thermal stability of the isomeric mixtures produced in this manner are comparable to the thermal stability of isomeric mixtures produced beginning with the corresponding vitamin A ester.

Example VII

The procedure of Example I is repeated but employing the reaction conditions and quantities of reactants listed in the table below.

50 g. of vitamin A palmitate is used in each instance. The temperatures recorded are those at which both the sodium borohydride reduction and the iodine isomerization are conducted.

| Solvent (500 ml.) | Iodine (mg.) | T° C. | Ml. lower alkanol | NaBH₄ (mg.) | Aqueous wash | |
|---|---|---|---|---|---|---|
| | | | | | Alcohol | Percent |
| n-Hexane | 25 | −10-0 | 5 methanol | 125 | i-propanol | 80 |
| n-Heptane | 25 | −10-0 | 2.5 ethanol | 250 | i-propanol | 80 |
| n-Pentane | 50 | 0-5 | 10 i-propanol | 500 | Methanol | 75 |
| Chloroform | 25 | 10-15 | 50 n-propanol | 250 | n-propanol | 50 |
| Tetrahydrofuran | 100 | 20-25 | 25 n-butanol | 600 | Ethanol | 50 |
| n-Hexane | 25 | 20-25 | 20 hexanol | 200 | ---do--- | 90 |
| Do | 25 | 20-25 | 5 methanol | 175 | Methanol | 50 |
| Do | 25 | 20-25 | 10 i-propanol | 125 | ---do--- | 90 |
| Do | 50 | 20-25 | 5 methanol | 500 | ---do--- | 80 |

Assay of the isomeric mixtures show about 65–75% vitamin to be present and about 35–25% other isomers. The products are thermally stable when heated for 24 hours at 100° C. in sealed ampuls.

*Example VIII*

Vitamin A Palmitate (5.12 g.) is dissolved in 50 ml. n-hexane and cooled at room temperature. A solution of iodine (100 mg.) in 100 ml. hexane is added and the reaction mixture stirred in subdued light for two hours at room temperature. At the end of this period sodium bisulfite (50 mg.) and 50 ml. water are added and the mixture stirred for 30 minutes. It is then washed with three 15 ml. volumes of water and the solvent removed by evaporation in vacuo at below 40° C.

The resulting isomeric mixture is found upon assay to comprise approximately 50% of vitamin A isomers, approximately 30% of which are isomers other than the all trans form. Considerable retrovitamin A is also present. The mixture undergoes extensive decomposition when heated at 100° C. for 24 hours.

*Example IX*

The procedure of Example I is repeated but using 25 mg. iodine rather than 50 mg. and three ml. pyridine as reducing agent in place of sodium borohydride.

The isomeric mixture thus produced contains approximately 68% vitamin A and undergoes extensive decomposition on storage at 100° C. for a 24 hour period.

*Example X*

Repetition of the procedure of Example I but substituting three ml. of pyridine plus 300 mg. of zinc dust as reducing agent in place of sodium borohydride produces an isomeric mixture containing approximately 74% vitamin A palmitate and approximately 26% other isomers. Upon heating at 100° C. for 24 hours the mixture undergoes decomposition with some darkening and development of a red color.

*Example XI*

The procedure of Example I is repeated but no methanol is added during the sodium borohydride reduction step. The reduction is allowed to run for two hours. The isomeric mixture obtained has substantially the same composition and stability as does the mixture of Example I.

*Example XII*

Substitution of potassium borohydride or lithium borohydride for sodium borohydride in the procedures of Examples I, IV and VI produces substantially the same results.

*Example XIII*

The procedure of Example I is repeated but substituting vitamin A alcohol for vitamin A palmitate. The isomeric mixture, upon assay, is found to contain vitamin A and neovitamin A in approximately a 2-1 ratio. The mixture is stable on storage is sealed ampuls for 24 hours at 100° C. By contrast, vitamin A alcohol isomerized and worked up according to the procedure of Example IX undergoes extensive decomposition on storage at 100° C. for 24 hours.

What is claimed is:

A stable vitamin A composition obtained by iodine isomerizing in a reaction-inert solvent a member selected from the group consisting of vitamin A, neovitamin A and carboxylic esters thereof and subsequently treating the isomerization mixture at a temperature from about −20° C. to about 25° C. with an alkali metal borohydride as reducing agent for the iodine, wherein the alkali metal has an atomic weight from 6 to 40.

References Cited in the file of this patent

UNITED STATES PATENTS

| | | |
|---|---|---|
| 2,709,711 | Robeson et al. | May 31, 1955 |
| 2,913,487 | Grassetti et al. | Nov. 17, 1959 |

OTHER REFERENCES

I. Am. Chem. Soc. vol. 69, pages 136 to 140 (1947).
J. Am. Chem. Soc. vol. 77, pages 4111 to 4119 (1955).
Gaylord: "Reduction With Complex Metal Hydrides," Interscience Publishers Inc., New York, pages 17 and 61 (1956).